United States Patent [19]

Lieser

[11] Patent Number: 5,069,569
[45] Date of Patent: Dec. 3, 1991

[54] UNIVERSAL JOINT

[75] Inventor: Frank Lieser, Wuppertal, Fed. Rep. of Germany

[73] Assignee: Ferro Tools Inc., City of Industry, Calif.

[21] Appl. No.: 698,164

[22] Filed: May 9, 1991

[51] Int. Cl.$^5$ ............................................. F16D 3/00
[52] U.S. Cl. .................................... 403/57; 403/359; 403/229; 403/74; 464/158
[58] Field of Search ................ 464/158, 159, 156, 147; 403/57, 74, 73, 359, 229, 341

[56] References Cited

U.S. PATENT DOCUMENTS

| | | |
|---|---|---|
| 61,581 | 1/1867 | Taylor . |
| 76,819 | 4/1868 | Ross . |
| 1,362,652 | 12/1920 | Tucker . |
| 2,303,813 | 12/1942 | Barcus . |
| 2,332,068 | 10/1943 | Fast . |
| 2,467,902 | 4/1949 | McPhee . |
| 2,687,025 | 8/1954 | Wildhaber . |
| 2,941,287 | 6/1960 | Cork . |
| 3,018,125 | 1/1962 | Cain ................................. 403/229 X |
| 3,897,703 | 8/1975 | Phipps . |
| 3,940,946 | 3/1976 | Andersen . |
| 3,959,987 | 4/1976 | Gary . |
| 4,080,079 | 3/1978 | Wagra .................................. 403/57 |
| 4,246,811 | 1/1981 | Bondus et al. . |
| 4,824,418 | 4/1989 | Taybert ................................ 464/159 |
| 4,938,731 | 7/1990 | Nguyen .......................... 403/359 X |

FOREIGN PATENT DOCUMENTS

| | | |
|---|---|---|
| 20665 | 4/1982 | Fed. Rep. of Germany . |
| 895731 | 5/1962 | United Kingdom . |
| 898152 | 6/1962 | United Kingdom . |

OTHER PUBLICATIONS

Abstract of German Patent 7,213,804, By: International Patent Report Ltd., London, Paris, New York.

Primary Examiner—Andrew V. Kundrat
Attorney, Agent, or Firm—Georges A. Maxwell

[57] ABSTRACT

A ball and socket-type Universal joint including an elongate female part with an elongate, central, polygonal socket opening entering one end and defining a flat axially disposed bottom and a plurality of elongate circumferentially spaced, radially inwardly disposed, longitudinally straight and laterally convex flats; an elongate male part with a shank and a semi-spherical polygonal head at one end of the shank and having a plurality of elongate circumferentially spaced, radially outwardly disposed, longitudinally extending, laterally straight and convexly curved facets. The head of the male part is engaged in the socket opening of the female part with opposing points on the flats and facets, along the central portions thereof, in circumferential driving and longitudinal sliding bearing engagement with each other. The other end of the female part is connected with an end of one elongate rotatable work piece, and the other end of the male part is connected with an end of another elongate work piece.

10 Claims, 4 Drawing Sheets

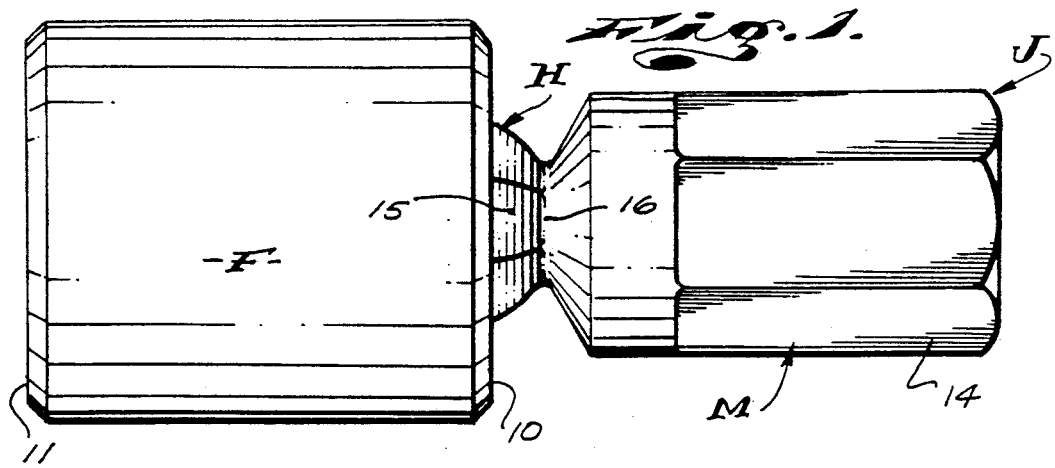
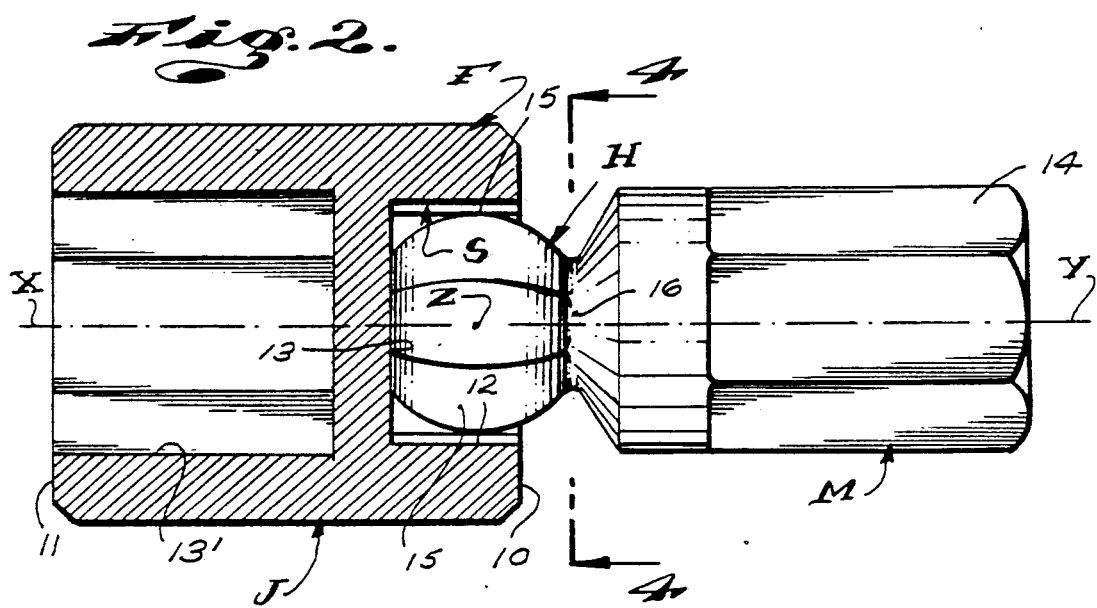
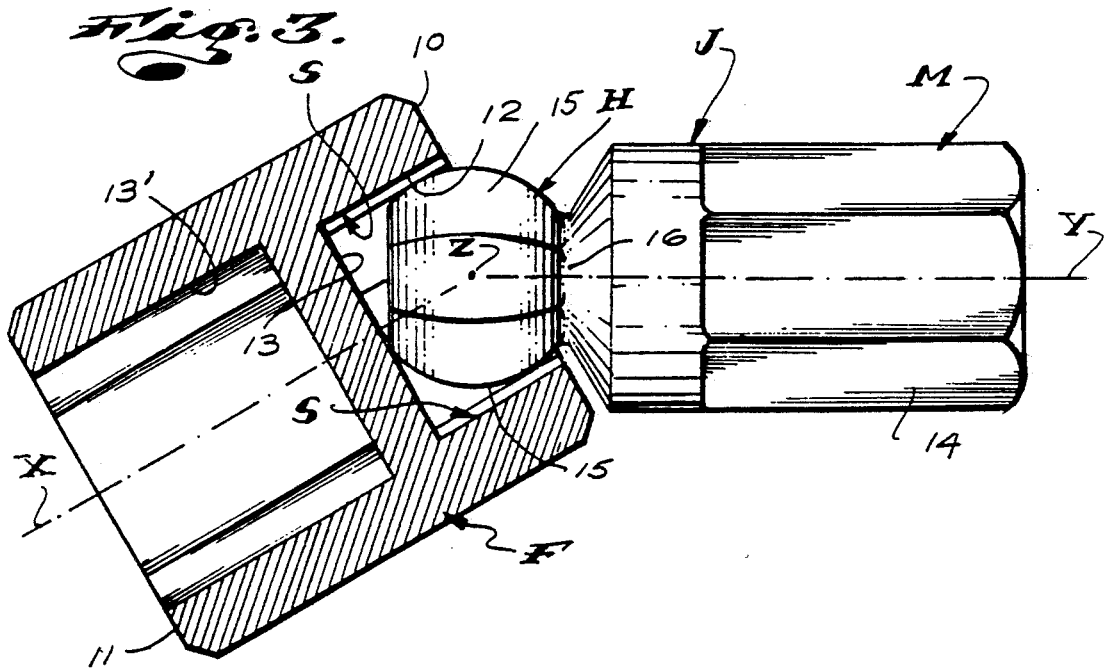

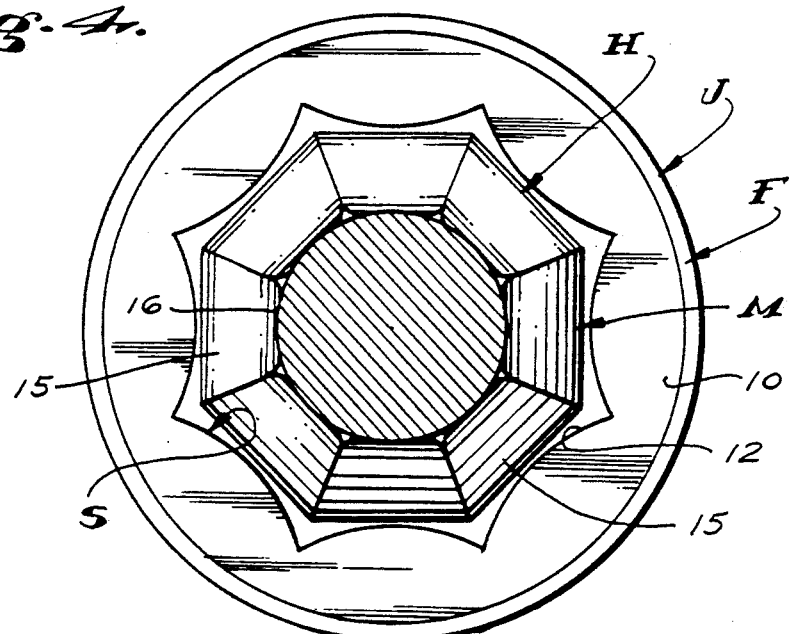
Fig. 4.
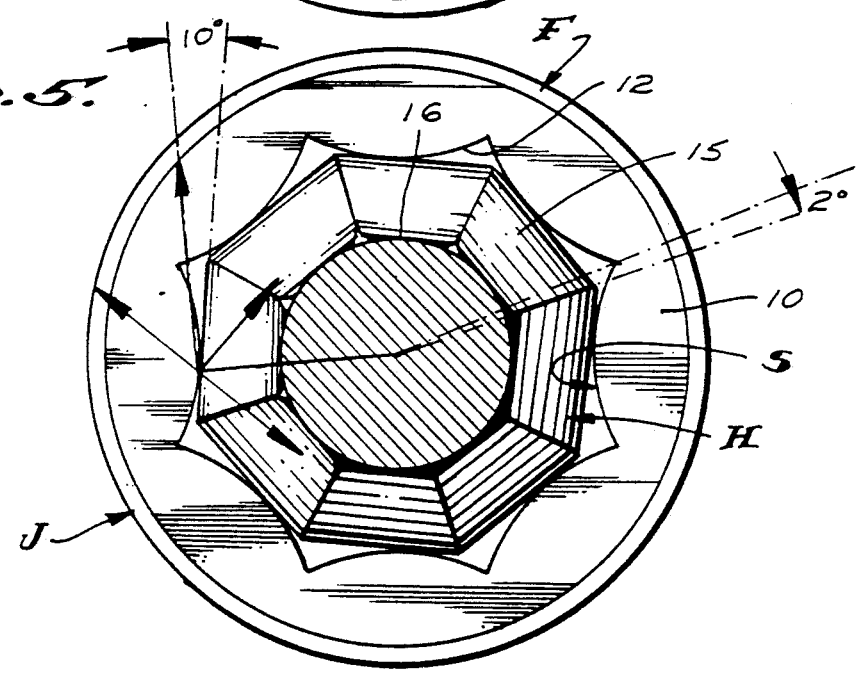
Fig. 5.
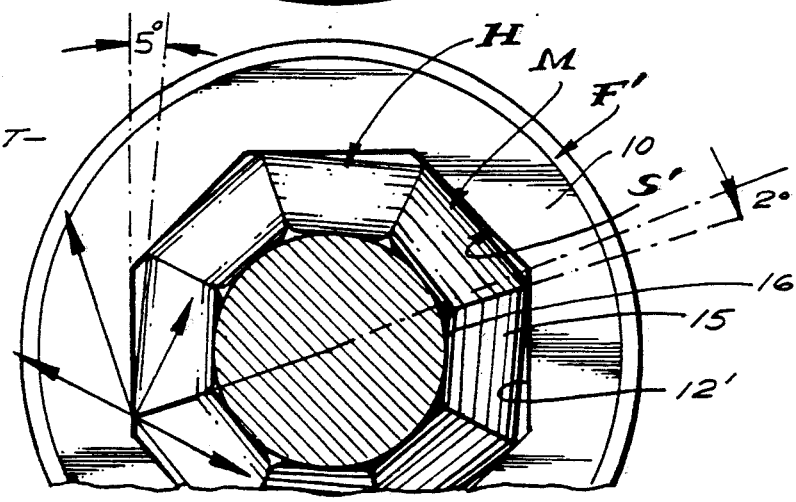
Fig. 6. —PRIOR ART—

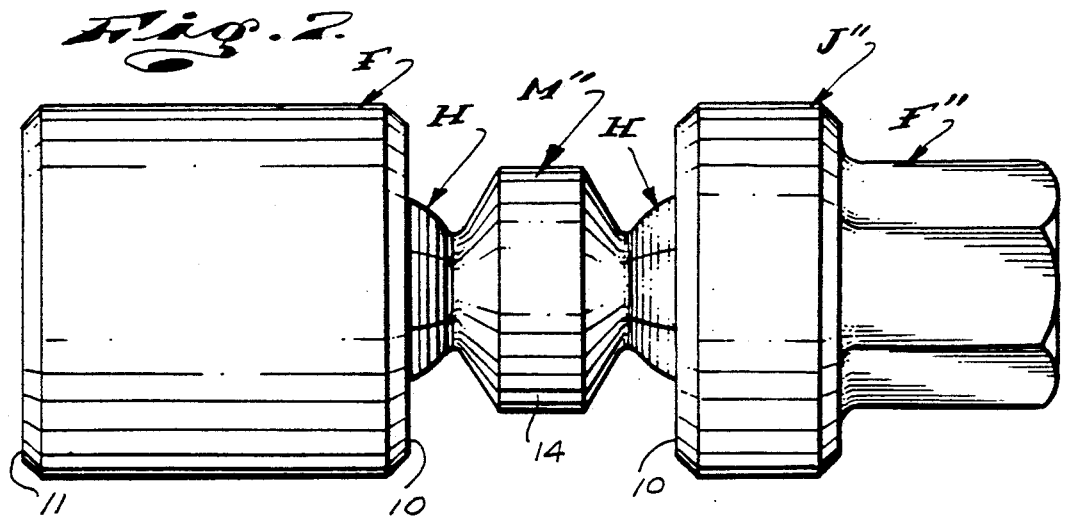
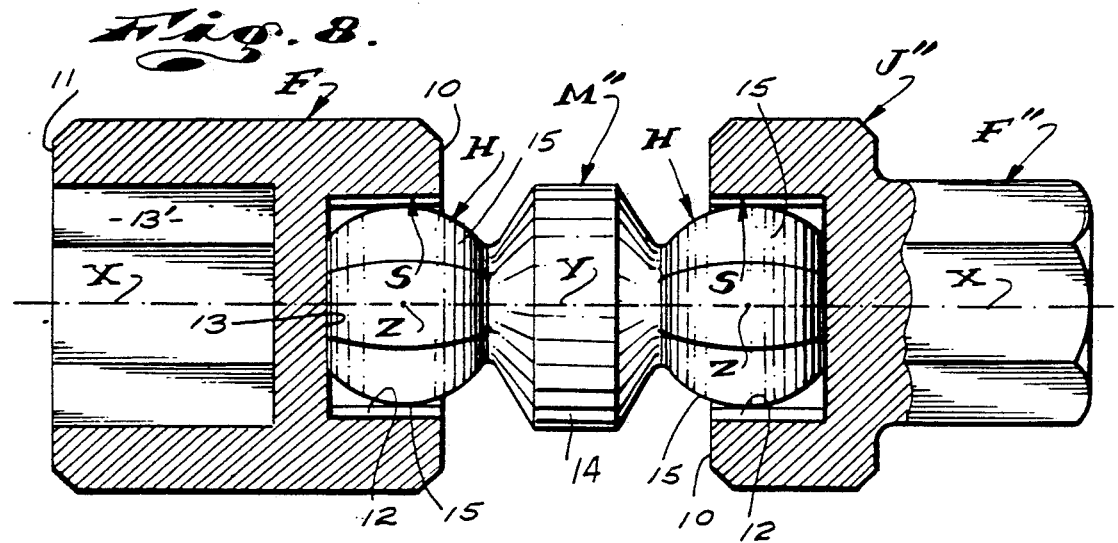
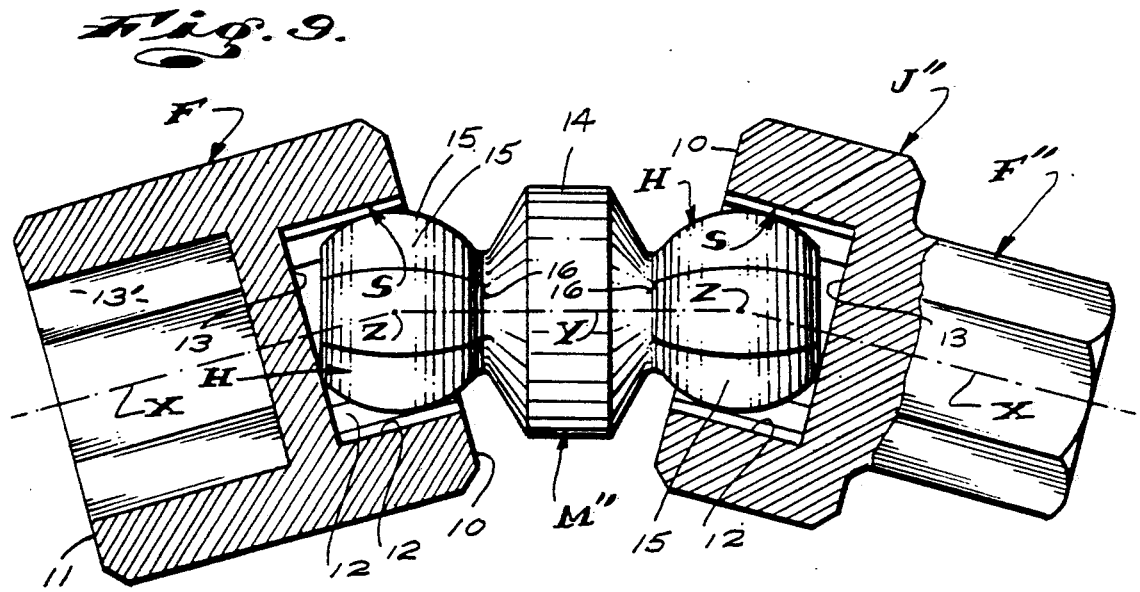

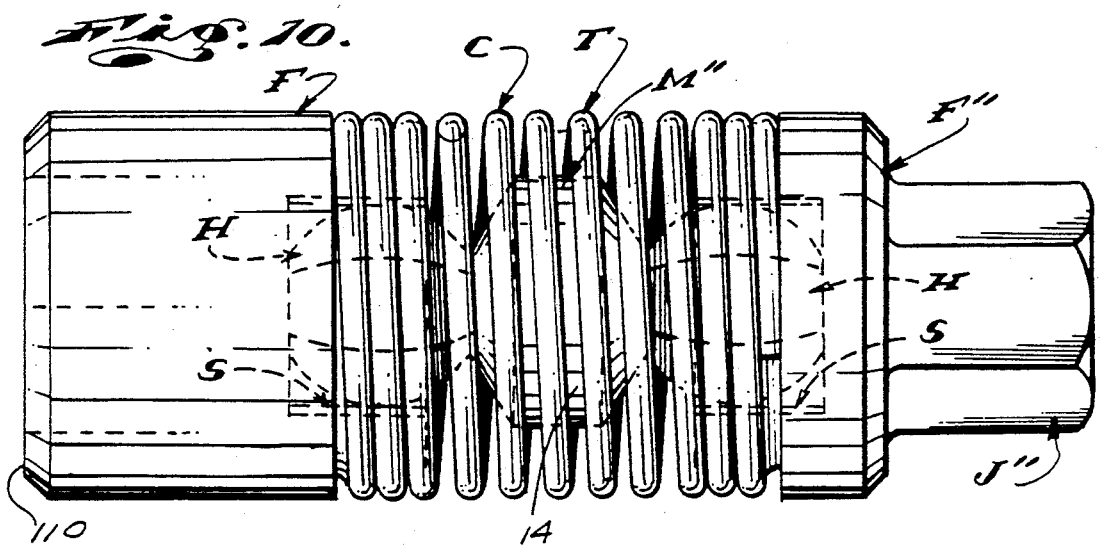
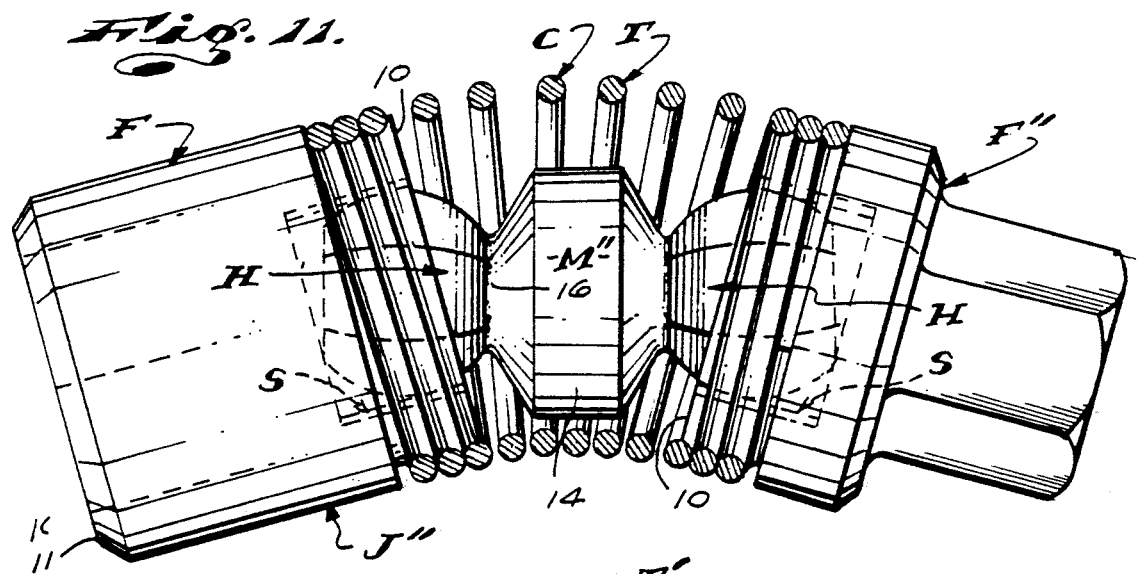
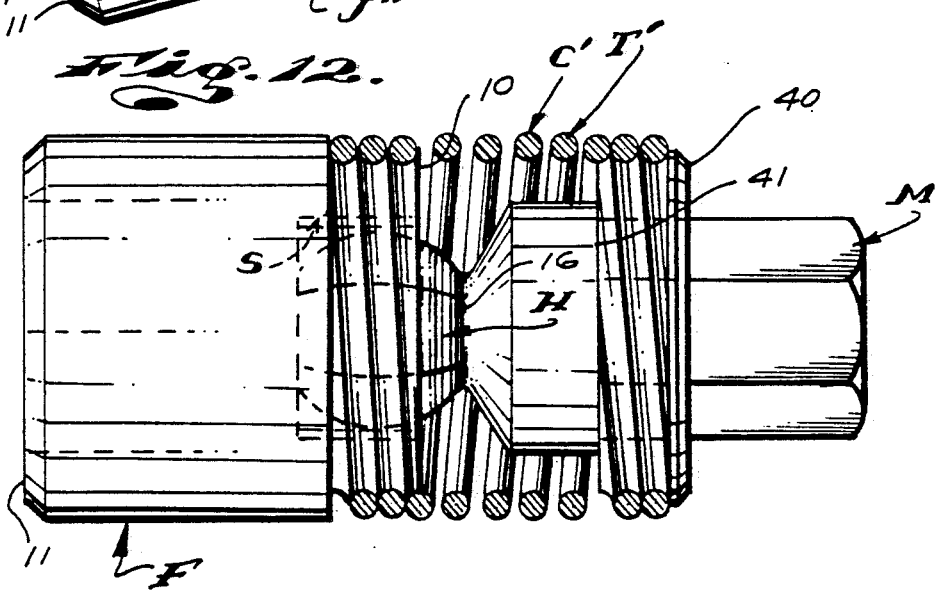

UNIVERSAL JOINT

PRIOR ART

The most pertinent prior art known to applicant is U.S. Pat. No. 3,897,703, issued Aug. 5, 1975 to Olin G. Phipps and entitled Universal Socket.

The above patent teaches a Universal Joint comprising an elongate female part with a polygonal socket opening with radially inwardly disposed axial extending flats and an axially outwardly disposed bottom; and, an elongate male part with a semi-spherical head with axially extending radially outwardly disposed, longitudinally convexly curved facets entered in the socket opening of the female part. A stop part in the form of a snap-ring holds the head against axial displacement from within the socket opening and a compression spring, between the head and the bottom of the socket opening yieldingly urges the head into stopped engagement with the stop part. The flats are flat or straight both longitudinally and laterally.

Other U.S. Patents that are pertinent to show the state-of-the-art, but do not require special comments, include:

U.S. Pat. No. 61,581, issued Jan. 29, 1867 to S. N. Taylor
U.S. Pat. No. 76,819, issued Apr. 14, 1868 to P. G. Ross
U.S. Pat. No. 1,362,652, issued Dec. 21, 1920 to J. E. Tucker
U.S. Pat. No. 2,303,813, issued Dec. 1, 1942 to J. W. Barcus
U.S. Pat. No. 2,332,068, issued Oct. 19, 1943 to G. Fast
U.S. Pat. No. 2,467,902, issued Apr. 19, 1949 to K. M. McPhee
U.S. Pat. No. 2,687,025, issued Aug. 24, 1959 to E. Wildhaber
U.S. Pat. No. 2,944,287, issued June 21, 1960 to G. H. Cork
U.S. Pat. No. 3,940,946, issued Mar. 2, 1976 to C. L. Andersen
U.S. Pat. No. 3,959,987, issued Apr. 1, 1976 to R. B. Gary
U.S. Pat. No. 4,246,811, issued Jan. 27, 1981 to J. R. Bondus, et al.

Pertinent Foreign Patent include:
German Patent No. 20,665, issued Apr. 9, 1882 to Rossler
British Patent No. 89,573, issued May 5, 1962 to W. Schloemann
British Patent No. 898,152, issued June 3, 1962 to Tacke, et al.

BACKGROUND OF THE INVENTION

Throughout the mechanical arts, Universal joints are provided to drivingly connect adjacent ends of pairs of elongate rotary shafts and the like; the longitudinal axes of which are misaligned or are subject to being moved in to and out of axial alignment during intended use and operation of the shafts.

In those situations where; the speed of rotation of a pair of angularly related axes shafts is high; the torsional forces encountered are low; and, the angle of deflection of the shafts is great; gimbo-type Universal joints, sometimes called Cardan joints or Hooke's couplings are most commonly used. Such joints are space-consuming; costly to make and maintain; and, are rather weak.

As a result of the above, in the many instances where gimbo-type joints cannot be advantageously employed and where circumstances otherwise permit, many in the art resort to the adoption and use of ball and socket-type Universal joints that are characterized by elongate female parts with outer ends that are secured to related ends of one of a pair of related shafts and inner ends with longitudinally inwardly opening socket openings defining flat longitudinally inwardly disposed bottoms and pluralities of circumferentially spaced, radially inwardly disposed, longitudinally extending flats. Such joints are next characterized by elongate male parts with outer ends that are secured to related ends of the other shaft of the pair of shafts. The male parts have substantially spherical balls or heads at their other or inner ends. The heads correspond in cross-section with the socket openings in their related female parts. That is, the heads have pluralities of circumferentially spaced, longitudinally extending facets that are laterally straight and that are curved longitudinally about the centers of the heads. The heads of the male parts are slidably engaged in the socket openings of the female parts so that, in theory, the facets on the heads of the male parts establish sliding engagement with the flats in the socket openings in the female parts.

The outer portions of the male parts are smaller in diameter than the heads or the heads are joined with the outer portions of their related male parts by intermediate neck portions of reduced diameter so that the heads are free to turn within their related socket openings and attain desired angular deflection of the parts.

With the above basic ball and socket-type joint structure, it will be apparent that the heads and socket openings cooperate to establish rotary driving engagement between the male and female parts and that the heads can be slidably turned within the socket openings to compensate for or to allow for axial misalignment or angular deflection of the parts.

Ball and socket Universal joints of the character referred to are extremely easy and economical to make and are extremely strong compared with gimbo-type joints such as referred to above.

The principal shortcomings found in ball and socket-type joints of the character referred to above reside in the fact that working clearances occur between the heads and the sockets. If such clearance is not built into the joints, it soon develops as the joints are used. As a result of the noted clearances, the flats and facets in the socket openings and on the heads of the joint parts do not, in fact, establish sliding bearing engagement with each other to establish rotary driving engagement between the parts. Instead, the heads of the male parts turn axially, a short distance, within the socket openings of the female parts so that only those edges on the heads that are defined by the converging side portions of adjacent facets engage the flats in the socket openings when the parts are rotatably driven. Further, due to the convex curvature of the convex edges, they only establish point contact with the flats.

When the male and female parts are axially misaligned and are in rotary driving engagement with each other, the points of contact between the noted edges and flats move or slide back and forth longitudinally relative to each other. That movement results in frictional wear and scuffing of the edges and the flats. Still further, the angle between the leading sides or the flanks of the noted edges (defined by the trailing edge portions of the facets) is extremely small and such that those sides of the edges tend to be urged into tight wedging engagement with the flats and result in wedging forces that tend to lock the parts together and to crush the noted edges at their points of contact with the flats. Finally, the trailing sides or flanks of the edges on the heads are moved from engagement with the flats in their related socket openings and are totally uncontained and unsupported.

As a result of the several above-noted shortcomings in joints of the character here concerned with, there is a great tendency for the edges on the heads of the female parts to be crushed, displaced, scuffed away or otherwise reduced to such an extent that the joints are rendered inoperative. Once reduction of the noted edges has commenced, the rate at which the noted edges are reduced accelerates at a rapid rate.

Another shortcoming found in ordinary ball and socket-type joints of the character referred to above resides in the fact that the turning forces (applied torque) are also turned or deflected within the joints, from the axis of one shaft to the axis of the other shaft. When those forces are deflected, as noted, portions thereof are resolved in what are essentially compressive forces between the edges on the heads of the male part and the flats in the socket openings in the female parts and are frictionally dissipated. The portions of those turning forces dissipated in friction increases exponentially with the increase of angular deflection between the parts.

Still further, the above-noted deflected forces are not deflected uniformly between the several edges and flats as the joints rotate but fluctuate as the parts of the joints rotate so that the greater part of those forces are concentrated on and through the related pairs of edges and flats as they move through that plane on which the shafts are angularly deflected. Thus, the greater part of the subject forces are intermittently concentrated on the one or a pair of related edges and flats that occur at diametrically opposite sides of the parts, on or near the noted plane on which the parts are angularly deflected.

Those forces lost to friction are, as noted above, all too often reach a point where they tend to cramp or freeze-up the joints and render them impractical to use or inoperable. Such cramping of the joints tends to occur and become troublesome when the angle of deflection of the male and female parts exceeds 22.5 degrees. When the forces encountered become sufficient to cause the joints to cramp, as noted above, they are often sufficient to result in the reduction of the edges on the heads of the male parts of the joints as noted above.

Another shortcoming existing in joints of the character referred to above resides in the fluctuation in the velocity of rotation of the two parts. This shortcoming can be and has long been overcome by connecting two joints in series. Such series connected joints are sometimes called compound joints.

Another shortcoming encountered in ball and socket-type joints of the character referred to above resides in the tendency for the male parts to slide out of engagement born within the socket openings in the female parts. The prior art has sought to eliminate this shortcoming by providing radially inwardly projecting stop flanges or equivalent stop means in the open end portions of the socket openings, past which the heads cannot move to become disengaged.

Yet another shortcoming encountered in joints of the character here concerned with is the tendency of the male and female parts to pivot freely relative to each other and in such a manner that the joints are difficult and troublesome to work with. The prior art has overcome this problem by placing axially extending compression springs between the bottoms of the socket openings in the female parts and the inner ends of the heads on the male parts. The springs urge the male parts axially outward into engagement with stop means within the socket openings. This relationship of parts effectively serves to yieldingly maintain the male and female parts against free pivoting relative to each other so that the joints can be easily and conveniently worked with.

OBJECTS AND FEATURES OF THE INVENTION

An object of this invention is to provide an improved ball and socket-type Universal joint of the general character referred to in the foregoing that is such that the forces directed between the male and female parts, when the joint turns, are transmitted between opposing points on related flats in the socket opening in the female part and on the longitudinally convexly curved facets on the head of the male part; which points of contact occur between and are spaced from the sides of those flats and facets and from edges on the head that are defined by adjacent facets, whereby those forces are not directed onto, through and across those weak, fragile and unsupported edges.

It is an object and feature of the present invention to provide a joint of the general character referred to above wherein the circumferentially spaced, longitudinally extending, radially inwardly disposed flats in the socket openings in the female part are laterally convexly curved whereby the central longitudinal portions of related opposing flats and facets are in closer relationship to each other than are their side portions and so that they establish stopped driving engagement with each other before said side portions can be moved into engagement with each other and before the edges on the head of the male part can be moved into engagement with the flats in the socket openings in the female part.

Yet another object and feature of the invention is to provide an improved joint of the general character referred to above wherein the wedging angle between the flats and facets in the female and on the male parts is materially greater than the wedging angle between the corresponding flats and facets of joints made in accordance with the teachings of the prior art.

An object of this invention is to provide an improved compound ball and socket-type Universal joint of the type described in the foregoing including a pair of axially spaced elongate female parts with outer work piece engaging ends and spaced apart opposing inner ends with central longitudinally extending inwardly opening socket openings with circumferentially spaced, longitudinally extending, radially inwardly disposed flats; an elongate intermediate male part positioned between the female parts and having a central elongate shank, heads at the opposite ends of the shank and engaged in the socket openings in the female parts, said heads having circumferentially spaced substantially radially outwardly disposed longitudinally convexly curved facets in opposed relationship with the flats; and, an elongate hellical spring in radial spaced relationship about the male part and with opposite ends secured to the inner ends of the female parts, said spring normally yieldingly holds the female parts against free pivotal movement relative to the male part and to each other and urges the female parts axially inwardly towards each other and in engagement with the male part.

The foregoing and other objects and features of the invention will be apparent and will be fully understood from the following detailed description of typical preferred forms and embodiments of the invention throughout which description reference is made to the accompanying drawings.

DESCRIPTION OF THE DRAWINGS

FIG. 1 is an elevational view of a universal joint embodying the invention;

FIG. 2 is an enlarged longitudinal sectional view of the joint shown in FIG. 1;

FIG. 3 is a view similar to FIG. 2 showing the parts in another position;

FIG. 4 is an enlarged transverse sectional view of the joint taken substantially as indicated by Line 4—4 on FIG. 2;

FIG. 5 is a view similar to FIG. 4 with parts in another position;

FIG. 6 (prior art) is a view similar to FIG. 5 and shows a joint structure embodying the teachings of the prior art;

FIG. 7 is a longitudinal elevational view of a compound universal joint embodying the invention;

FIG. 8 is a sectional view of the structure shown in FIG. 7;

FIG. 9 is a view similar to FIG. 8 showing parts in another position;

FIG. 10 is a longitudinal elevational view of the structure shown in FIG. 7 and including resilient coupling means;

FIG. 11 is a view similar to FIG. 10 with parts shown in section and in different positions; and, FIG. 11 is a view of the structure shown in FIG. 2 with a resilient coupling means related to it.

DETAILED DESCRIPTION OF THE INVENTION

Referring to the drawings, FIGS. 1 through 6 illustrate a ball and socket-type Universal joint J embodying the present invention.

The joint J includes an elongate female part F with inner and outer ends 10 and 11 and a central longitudinal turning axis X. The part F is shown as being cylindrical in cross-section and is formed with an elongate central, longitudinally extending, inwardly opening polygonal socket opening S entering its inner end 10. The socket opening S defines or is characterized by a plurality of circumferentially spaced, longitudinally extending, radially inwardly disposed flats 12 and a radially extending, axially inwardly disposed bottom 13. The outer end of the part F is adapted to be connected with an elongate shaft, tool or other rotatable work piece that is axially aligned with the part F. In the case illustrated, the outer end of the female part is formed with an elongate longitudinally extending longitudinally outwardly opening socket or recess 13' in which a part or a portion of a piece of work (not shown) can be engaged in rotary driving engagement with the part F. The recess 13' can, for example, be a polygonal socket opening in which a polygonal shank on a shaft or tool can be cooperatively engaged.

The joint J next includes an elongate male part having inner and outer ends and a central longitudinal axis Y. The part M is characterized by or includes an inner ball or head H at its inner end and an elongate longitudinally extending shank 14 at its outer end. The shank 14 is adapted to be connected with another or second elongate shaft, tool or other rotatable work piece (now shown) that is axially aligned with the part M, to establish rotary driving engagement therewith.

The shank 14, for example, can be polygonal in cross-section and such that it can be cooperatively slidably engaged in a polygonal socket opening in the end of said other work piece.

It is to be understood and it will be apparent that the recess 13' in the part F and the shank 14 of the part M are only typical of kinds of means that can be provided at the outer ends of the parts F and M to connect them with the work pieces with which the joint is related.

The head portion H at the inner end of the part M is a substantially semi-spherical polygonal part or portion of the part M. The head is characterized by a plurality of circumferentially spaced, elongate, laterally straight and longitudinally convexly curved facets 15. The facets 15 are curved radially about the center Z of the head H. The center Z of the head occurs at the center line or axis Y of the part M. The cross-section of the head H, through that radial plane that is normal to the axis Z of the part M is substantially similar in cross-section with the radial cross-section of the socket opening S in the part F.

In the preferred carrying out of the invention and as shown, the inner end of the head H is truncated so as to simplify its manufacture and to eliminate unused and unneeded stock. The outer end of the head is integrally joined with the shank 14 by a central longitudinally extending intermediate neck portion 16, of reduced diameter.

As clearly shown in the drawings, the head H of the part M is slidably engaged in the socket opening S in the part F, to establish rotary driving engagement between those parts. The head is rotatable in the socket opening through planes that are parallel with the axis Y, so that the parts F and M can be pivotally moved relative to each other and to move their axes X and Y into and out of axial alignment, as desired or as circumstances require.

If the joint J was made in accordance with old practices, the flats 12 of the socket opening S in the part F would be straight or flat across their lateral extent, as shown at 12' in FIG. 6 (prior art) of the drawings.

In accordance with this invention and as clearly shown in FIGS. 4 and 5 of the drawings, the flats 12 in the socket opening S in the part F, while being straight longitudinally, they are radiused or convexly curved laterally. With this novel form of flats in the socket opening S, it will be apparent that the central longitudinal portion of each flat 12 is closest to and theoretically contacts that point on its related opposing facet 15 on the head H of the part M that occurs on the radial plane through the female part F that extends through the center Z of the head, whatever the angle of deflection between the axis X and Y of parts F and M might be.

The opposite, longitudinally extending, side portions of the laterally convex flats 12 turn away and are spaced from the opposing side portions of their related facets, as clearly shown in FIG. 4 of the drawings.

As a result of the above and as shown, the points of contact between the related flats and facets 12 and 15 are at and along the central portions of the facets, spaced between and from the side portions thereof.

For the purpose of better illustrating the invention, in FIGS. 4, 5 and 6 of the drawings the parts F and M are shown to be formed so that sufficient running and/or working clearance occurs between the heads and socket openings so that the heads turn within the socket openings about 2 degrees before the facets and flats engage. While in practice, the parts might be made so that the flats and facets originally or first established sliding engagement with each other, some working clearances, soon develop as the joints break-in and wear.

Referring to FIG. 6 of the drawings, it is to be particulaly noted that when the head H of the male part M is turned clockwise in the female part F', the edges of the head defined by the converging side portions of adjacent facets 15, move or advance clockwise into bearing contact with the flats 12' of the socket S' of the part F' otherwise stated, the edges at the trailing sides of the facets move or advance circumferentially in the female part into bearing contact with opposing trailing side portions of their related flats. The side portions of the facets following or trailing the edges are caused to move away from the flats and are totally unsupported.

The side portions of the facets leading or in advance of the edges are at a low wedging angle of about 5 degrees with their related flats. The turning forces that are normal to the radial planes through the edges on the head are directed into the wall of the female part and their counter or reactive forces are directed back into and counterclockwise through the unsupported edge portions of the head, substantially as illustrated. Thus, the reactive forces are directed back onto or through those points on the edges of the head that contact the flats and in such a manner that those points on their edges are highly subject to being crushed, displaced or reduced.

Referring to FIG. 5 of the drawings wherein the flats 12 are laterally convexly curved, the male part M is shown turned 2 degrees clockwise in the female part F to where the facets stop and establish bearing engagement with their related flats. It will be apparent that in this novel construction the contact points on the facets are only slightly offset from the central longitudinal planes of the facets and are within the central portions thereof. Those points of contact are spaced a substantial distance from the edges on the head defined by the facets. The reactive counter forces are directed back into and through the body of the head where there is sufficient stock or mass of material so that the likelihood of crushing, displacing or reducing any part of the head is minimal and unlikely to occur. Also, the wedging angle between the facets and the flats, is about 10 degrees or twice the wedging angle that occurs in the old art and as is shown in FIG. 6 of the drawings.

It is also to be noted that the radius of lateral curvature of the flats 12 is sufficiently great and the flats are sufficiently close to being flat so that weak and unsupported ridges or edges that might be subject to being displaced and reduced by the head are not presented.

In the case illustrated, the socket opening S and head H are octagonal in cross-section. In the case illustrated, the radius of curvature of the flats is substantially equal to the minor inside radius of the socket opening S.

In practice, the number of flats and facets can be varied as desired or as circumstances require. In small diameter joints, due to the lack of adequate stock to work with, the number of flats and facets might have to be reduced; while in large diameter joints, where stock permits, the number of flats and facets might be advantageously increased.

It is important to note that with the novel structure here provided, the wedging angle between the flats and facets is nearly double or twice the wedging angle would be presented if the flats were not convexly curved. As a result of the noted increase in the wedging angle, the wedging (compressive) forces at and between the flats and facets that tend to cause the bearing surfaces to bind and lock up are materially reduced.

When the male and female parts are angularly deflected as shown in FIG. 3 of the drawings and the parts rotate, the points of contact between the flats and facets move back and forth longitudinally of the facets. They move back and forth twice through each complete revolution of the joint structure. At those points of contact that are on a plane that is normal to that plane on which the parts of the joint are angularly deflected, radial loading between the parts is substantially zero. As parts rotate and the noted points of contact move from the above-noted normal plane through the structure toward that plane on which the parts are angularly deflected, the radial loading forces increase at an exponential rate to a maximum extent. Thereafter, as the parts continue to rotate or turn, those forces decrease at an exponential rate until the points once again move to said normal radial plane. It will be apparent that as the angle of deflection of the parts increases, the distance the noted points of contact move increases correspondingly, while the radial bearing forces between the parts, increases at an exponential rate.

In accordance with the teachings of the prior art and as shown in FIG. 6 of the drawings, where the above-noted lateral loads are imposed upon sharp, unsupported, fragile edges or edge portions on the heads; as the parts rotate, the edges on the head move longitudinally, back and forth relative to and are forceably driven into the flats in the female parts to slice into, mutilate and otherwise reduce the surfaces of the flats; and, at the same time, crushed and/or reduced against the flats. Such reduction of the flats and edges, however slight it might be, materially increases drag and friction loss between the parts and notably adversely affects the effectiveness and efficiency of the joints.

With the improved structure of the present invention, the points of contact between the central portions of the faces and gently crown, convexly curved flats occur at and between nearly flat opposing portions of the flats and facets to assure superior sliding bearing engagement between the parts. The points of engagement are spaced and free from the sharp and fragile edges of the head. As the structure of this invention operates and is used, the bearing points and/or surfaces wear smoothly and are not subject to being reduced in a manner that might bring about adverse effects.

It has been observed that joints provided by the prior art tend to commence to cramp when the parts are angularly deflected more than 15 degrees and often become bound and inoperative before the angle of deflection reaches 25 degrees. It has been observed that joints embodying the present invention become cramped at a notably slower rate and do not become bound until the angle of deflection of the parts exceeds 30 degrees.

FIGS. 7, 8 and 9 of the drawings illustrate a double or compound universal joint J" embodying the present invention. In this embodiment of the invention, an elongate double-headed male part M" including an inner, central, coupling portion or shank 14 and a pair of outer heads H similar to the heads H in the first embodiment of the invention at its opposite ends is provided. The joint J" next includes a pair of elongate female parts F and F", each related to a related head H of the part M" in the same manner that the female and male parts of the first embodiment of the invention are related to each other.

Throughout the drawings, unless otherwise changed, all like and corresponding parts and portions of the structures shown are identified by the same reference characters and numerals.

In this second embodiment of the invention, the female part F is a socket part similar to the part F in the first form of the invention and the part F" rather than being provided with an outwardly opening drive socket or recess is provided with an outwardly projecting polygonal drive shank.

This second embodiment of the invention functions like and attains the same advantages as the first embodiment of the invention. In addition thereto, it effectively doubles the maximum potential angular deflection that the joint can attain. Further, it effectively compensates for variations in velocity ratios between the two female parts and therefore provides what can be said to be a more uniform and smoother operating joint. Most important, this second embodiment of the invention provides a joint that is far more efficient and easier to turn than is the joint of the first embodiment of the invention when the angle of deflection afforded by the second embodiment of the invention is the same as that afforded by the first embodiment of the invention. This is due to the fact that the angle of deflection between the male part M" and each of the female parts F and F" is but one-half of the angle of deflection of the male part M and female part F in the first embodiment of the invention. The fact that the ratio of increase in friction loss between each head and its related female part increases exponentially with the increase of angular deflection, the total friction loss between the male part M" and its related female parts F and F" is notably less than the friction loss between the male and female parts M and F of the first embodiment of the invention (when the angle of deflection is the same).

In FIGS. 10 and 11 of the drawings, a third embodiment of the invention is illustrated. In this third embodiment of the invention, a compound joint similar to the joint shown in FIGS. 7 through 9 is provided. This joint structure further includes a novel coupler means C to yieldingly urge the female parts F and F' axially inwardly towards each other and into axial stopped bearing engagement with the outer ends of their related heads on the male part M"; and, to normally yieldingly maintain the pair of female parts and their related intermediate male part in axial alignment. The coupler means C consists of an elongate normally straight, axially extending and laterally flexible hellical tension spring T positioned in radial spaced relationship about the male part and extending axially between the inner opposing ends of the female parts. The spring T has opposite end portions secured to the inner ends of its related female parts.

In the case illustrated, the spring T has opposite end portions yieldingly slidably engaged about the inner end portions of their related female parts. The inner portions of the female parts are formed with radially outwardly opening hellical grooves in which turns of the spring are engaged to retain the spring against axial displacement from the female parts.

The spring T is normally tensioned axially so that it yieldingly urges the female parts towards each other and into stopped engagement with the heads of the male part. Due to the fact that the spring T is normally straight and exerts uniform tensile forces between and about the inner perimeters of the female parts, it functions to normally maintain the several parts aligned, while yieldingly allowing the parts to be urged out of alignment, as clearly shown in FIG. 11 of the drawings.

The coupling means C affords several important advantages over the provision and use of compression springs between the bottoms of the socket openings and the inner ends of the heads of Universal joints, as is commonly practiced by the prior art. The most important of those advantages resides in the fact that the heads are normally maintained in stopped engagement with the bottoms of their related socket openings and need not be yieldingly urged and moved against the resistance of a spring or the like to establish that desired relationship of parts. Next, the spring T is not in a position between the bottom of the socket (S) and head (S) where it is subject to being crushed or otherwise damaged by compressive forces acting through the joint. Next, the spring T is substantially larger in diameter and in axial extent than the noted prior art springs that are made to be contained within the socket openings to engage the free ends of the heads of their related joints. Accordingly, the spring T can be made larger, more durable and structurally sounder than the prior art springs. Still further, the large diameter of the spring and its relationship with the parts of the joint imparted with notably greater mechanical advantage than do the small springs provided by the prior art. Finally, the spring T forms a shield about the male part and between the female parts to prevent one's fingers or other structure from entering the space between the female parts and about the male part in such a manner as to cause damage or adversely affect the operation of the joint.

FIG. 12 of the drawings illustrates an embodiment of the invention similar to the first embodiment of the invention but with a coupling means C', similar to the means C shown in FIGS. 10 and 11 of the drawings related to it. In this embodiment of the invention, an annular spring mounting collar 40 with a radially outwardly opening hellical groove about its perimeter is slidably engaged about the shank of the male part and is stopped against a shoulder 41 adjacent the inner end of the shank, as clearly illustrated. The spring T' in this embodiment of the invention is related to the female and male parts in the same manner that the spring T is related to the two female parts in the previous embodiment of the invention and functions in the same manner as does the spring T.

Having described only typical preferred forms and embodiments of the invention, I do not wish to be limited to the specific details herein set forth but wish to reserve to myself any modifications and/or variations that might appear to those skilled in the art and which fall within the scope of the following claims.

Having described my invention, I claim:

1. An improved Universal joint comprising an elongate female part with an outer end to connect with one of a pair of elongate rotatable work parts in axial alignment therewith and an inner end with a central elongate axially inwardly opening socket opening having a substantially flat radial axially inwardly disposed bottom and a plurality of circumferentially spaced radially inwardly disposed longitudinally extending, longitudinally straight and laterally convexly curved flats; an elongate male part with inner and outer ends and including a semi-spherical head at its inner end, said head has a plurality of circumferentially spaced radially outwardly disposed, longitudinally extending, laterally straight and longitudinally radially curved convex facets and is engaged in the socket opening in the female part with its facets opposing the flats in the socket opening; and, a shank at the outer end of the male part to connect with the other of said pair of elongate work parts in axial alignment therewith; the flats and facets have laterally spaced longitudinally extending side portions and longitudinally extending central portions, the central portions of the facets establish sliding bearing point-bearing engagement with the central portions of their related flats.

2. The joint set forth in claim 1 wherein the inner end of the head has a flat radially extending inwardly disposed surface normally opposing and stopped against the bottom of the socket opening.

3. The joint set forth in claim 1 that further includes coupling means normally yieldingly holding the male and female parts in axial alignment with each other and including an elongate hellical spring with one end anchored to the inner end of the female part and extending inwardly therefrom in radial spaced relationship about a portion of the male part and having its other end anchored to the male part.

4. The joint set forth in claim 2 that further includes a coupling means normally yieldingly holding the male and female parts in axial alignment and urging those parts axially inwardly towards each other and the head of the male part engaged with the bottom of the socket opening in the female part and including an elongate hellical tension spring with one end anchored to the inner end of the female part to extend axially inwardly therefrom in radial spaced relationship about a portion of the male part and having its other end anchored to the male part.

5. The coupling set forth in claim 1 that further includes coupling means normally yieldingly holding the inner end of the male part in bearing engagement with the bottom of the socket opening in the female part and including an elongate tension spring with one end anchored to the inner end of the female part and projecting inwardly therefrom about the male part and having its other end anchored to the male part.

6. An improved compound Universal joint comprising a pair of spaced apart elongate female parts each having an outer end to connect with a related one of a pair of elongate rotatable work pieces in axial alignment therewith and having an inner end with a central elongate axially inwardly opening socket opening having a flat substantially radially extending, axially inwardly disposed bottom and a plurality of circumferentially spaced, radially inwardly disposed, longitudinally extending, longitudinally straight and laterally convexly curved flats; an elongate male part with a central shank portion positioned between the inner ends of the pair of female parts and having semi-spherical heads at its opposite ends each engaged in the socket openings of a related female part, the heads have a plurality of circumferentially spaced, radially outwardly opening, longitudinally extending, laterally straight and longitudinally radially curved convex facets; the facets on the heads occur in close running clearance with the flats in the socket openings, the flats and facets have laterally spaced longitudinally side portions and central longitudinally extending central portions, the central portions of the facets establish sliding bearing point engagement with the central portions of their opposing flats.

7. The joint set forth in claim 6 wherein the inner ends of the heads have flat radially extending axially inwardly disposed surfaces normally establishing flat stopped engagement with the bottoms of the socket openings.

8. The joint set forth in claim 6 that further includes coupling means normally yieldingly maintaining the male and female parts in axial alignment and including a normally straight elongate hellical spring positioned about the male part and having opposite end portions each anchored to a related female part.

9. The joint set forth in claim 6 that further includes coupling means to normally yieldingly urge the female parts longitudinally inwardly with the bottoms of their socket openings in stopped engagement with the inner ends of the heads and including an elongate hellical tension spring in radial spaced relationship about the male part and having opposite ends anchored to related inner ends of the female parts.

10. The joint set forth in claim 9 wherein said spring is normally straight and normally yieldingly holds the male and female parts in axially alignment with each other.

* * * * *